United States Patent
Krasuski et al.

(10) Patent No.: US 6,327,042 B1
(45) Date of Patent: Dec. 4, 2001

(54) ELECTRONIC PAGE INVERTER FOR A MAIL PROCESSING SYSTEM, AND A FOLDER-INSERTER INCLUDING SUCH AN INVERTER

(75) Inventors: Marek Krasuski, Fontenay aux Roses; Dominique Mazeiller, La Frette sur Seine, both of (FR)

(73) Assignee: Neopost Industrie, Bagneux (FR)

( * ) Notice: Subject to any disclaimer, the term of this patent is extended or adjusted under 35 U.S.C. 154(b) by 0 days.

(21) Appl. No.: 08/196,440

(22) Filed: Feb. 15, 1994

(30) Foreign Application Priority Data

Feb. 17, 1993 (FR) .................................................. 93 01779

(51) Int. Cl.$^7$ ...................................................... B41B 15/00
(52) U.S. Cl. .......................................... 358/1.12; 355/202
(58) Field of Search ..................................... 395/101, 111, 395/117; 358/400, 401, 402, 403; 355/202

(56) References Cited

U.S. PATENT DOCUMENTS

| | | | |
|---|---|---|---|
| 4,158,500 | * | 6/1979 | DiFrancesco et al. ................ 355/319 |
| 4,184,671 | * | 1/1980 | Sasamori ................................ 271/18 |
| 4,355,880 | * | 10/1982 | Stemmle ............................... 355/318 |
| 4,384,782 | * | 5/1983 | Acquaviva ............................ 355/318 |
| 4,524,557 | * | 6/1985 | Silverman et al. ..................... 53/55 |
| 4,602,775 | * | 7/1986 | Calhoun et al. ....................... 270/55 |
| 4,835,544 | * | 5/1989 | Winterburn .............................. 347/2 |
| 4,955,186 | * | 9/1990 | Gough .................................... 53/569 |
| 4,992,871 | * | 2/1991 | Bensch et al. ......................... 348/468 |
| 5,099,633 | * | 3/1992 | Gambault et al. . |
| 5,172,162 | * | 12/1992 | Taheda .................................. 355/202 |
| 5,207,412 | * | 5/1993 | Coons, Jr. et al. ................... 364/478 |
| 5,270,830 | * | 12/1993 | Suzuki .................................. 358/400 |
| 5,282,350 | * | 2/1994 | Crowley ................................ 53/435 |
| 5,343,556 | * | 8/1994 | Silverberg ............................ 395/111 |

FOREIGN PATENT DOCUMENTS

0479494A3   4/1992   (EP) .

OTHER PUBLICATIONS

Simpson, "Mastering WordPerfect® 5.1+5.2 For Windows™," *Sybex Inc.*, pp. 305+306, 30, 31, 74, Feb. 12, 1993.*
Japanese Patent Abstract JP 62133520 dated Jun. 16, 1987.
French Search Report FR 9301779.

* cited by examiner

*Primary Examiner*—Garcia Gabriel
(74) *Attorney, Agent, or Firm*—Sughrue, Mion, Zinn, Macpeak & Seas, PLLC

(57) ABSTRACT

The inverter makes it possible to use a very simple conveyor for coupling the outlet of a printer in a word processor system to the inlet of a folder-inserter, even though the printer outputs printed pages in an order that is unsuitable for direct insertion into envelopes. The inverter includes a read/write memory in which the sequence of binary words representing the text of a letter is stored as it is output by the word processor system, with the address of the beginning of each page of text being identified. These binary words are played back, page by page, with the pages being played back in inverted order of text pages, but with the characters making up the pages being played back within each page in their initial order. The invention is applicable to folder-inserters for preparing mail.

8 Claims, 1 Drawing Sheet

ELECTRONIC PAGE INVERTER FOR A MAIL PROCESSING SYSTEM, AND A FOLDER-INSERTER INCLUDING SUCH AN INVERTER

FIELD OF THE INVENTION

The invention relates to an electronic page inverter for a mail processing system comprising:
- a simple word processor system constituted, for example, by a CRT screen, a keyboard, a central unit, and a sheet-fed printer; and
- at least one folder-inserter enabling the sheets of a letter to be placed in an envelope.

BACKGROUND OF THE INVENTION

When the system is small and produces a small quantity of letters, the printer is generally not mechanically coupled to the folder-inserter. Transfer is performed manually. The user takes the sheets at the outlet from the printer and inserts them in an inlet of the folder-inserter. Two types of printer need to be distinguished: some printers provide the sheets on which a letter has been printed in an order suitable for enabling the sheets to be inserted directly in an envelope. Other printers provide the sheets in an order that is unsuitable for direct insertion in an envelope since the addressee would find the last page in front of the first page. The user must therefore not only transfer the sheets manually, but must additionally change the order of the sheets.

To make such a system of mail handling more practical, the outlet of the printer could be mechanically coupled to the inlet of the folder-inserter. However, such mechanical coupling must solve the problem of inverting page order if the printer already owned by the user does not provide pages in the proper order for direct insertion in an envelope. A mechanical page inverter could be associated with the printer, such as described in European patent applications EP 0 365 283 and EP 0 398 187, however such mechanical devices are difficult to fit to an already-existing printer that a user does not want to change because of the cost of such a change.

OBJECT AND SUMMARY OF THE INVENTION

The object of the invention is to enable transfer to be performed automatically between a printer and a folder-inserter, when the printer is of the type that provides the pages of a letter in an order that is not suitable for direct insertion in an envelope, without requiring the entire printer to be changed, and without requiring major mechanical modifications to be made, and without requiring a change of word processor software.

The present invention provides an electronic page inverter for a mail processing system comprising:
- a word processor system;
- a sheet-fed printer;
- means for electrically coupling the printer to said word processor system; and
- a folder-inserter mechanically coupled to the printer to: receive the sheets on which the printer has printed the text of a letter; to fold said sheets; and to insert them in an envelope;
- wherein the means for coupling the printer to the word processor system include means for storing a sequence of binary words representing a letter as said sequence is output by the word processor system, with the beginning of each page of text being identified; and for playing back said binary words page by page with pages being played back in inverted order, but with the characters making up each page being played back in the initial order.

A simple mail processing system that would otherwise have required pages to be transferred manually from the printer to the folder-inserter, and to be inverted manually, can thus be made more practical with the inverter as defined above since a simple mechanical device now suffices to couple the output of the printer to the input of the folder-inserter, page inversion being performed without using any mechanical device, but by using an electronic device which is very cheap to implement, and which is very easy for an unspecialized user to connect between the word processor system and the printer.

The invention also provides a folder-inserter including an inverter of the invention. Such a folder-inserter enables a user who already possess a word processor system and a printer that provides sheets in an order that is not suitable for direct insertion, nevertheless to implement a more sophisticated mail treatment system by adding a folder-inserter fitted with said inverter, thereby solving the problem due to the sheets being in reverse order.

BRIEF DESCRIPTION OF THE DRAWING

The invention will be better understood and other characteristics will appear from the following description and the accompanying figures, in which.

MORE DETAILED DESCRIPTION

Figure 1:
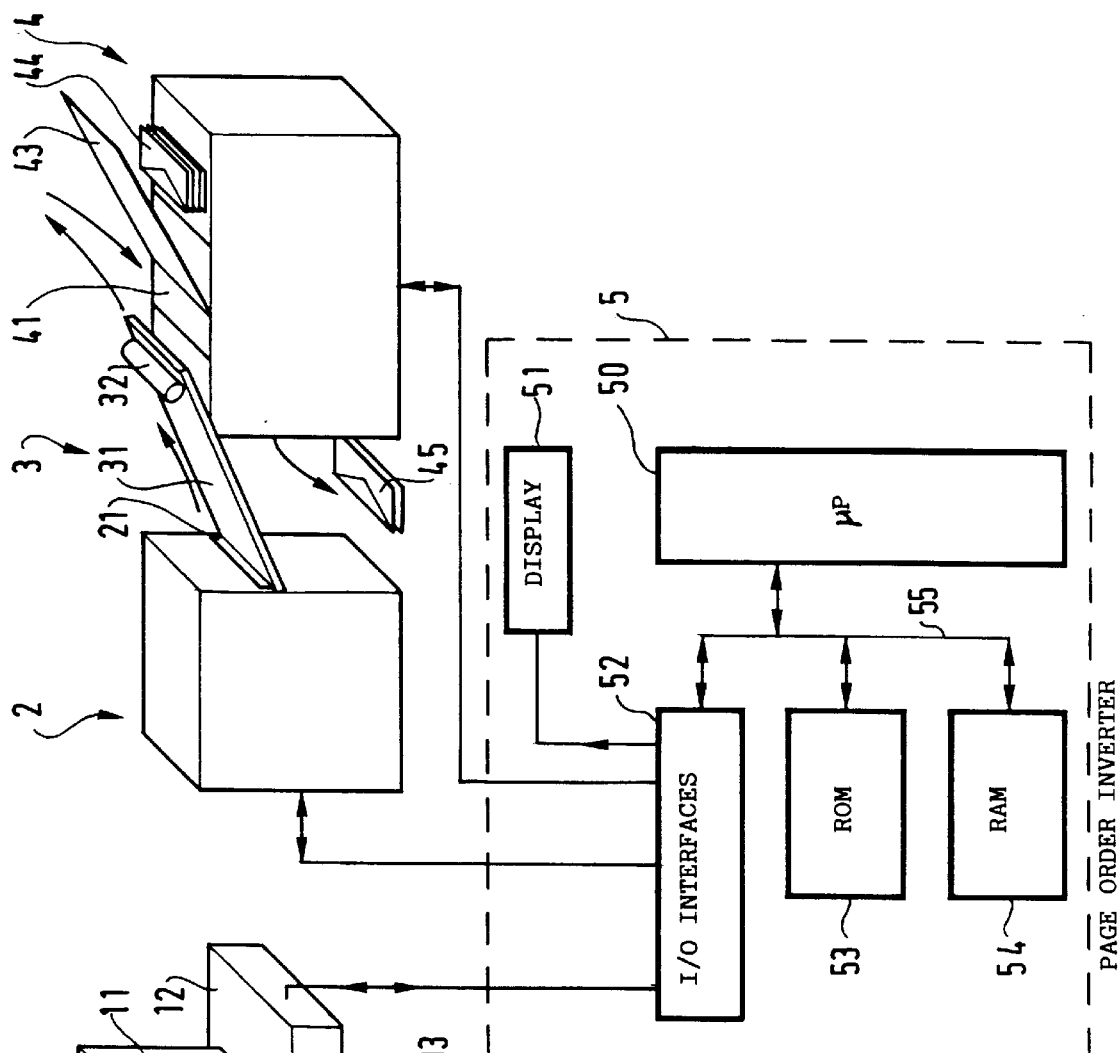
FIG. 1 is a diagram of a mail processing system including an embodiment of the inverter of the invention.

This embodiment comprises: a word processor system 1 constituted by a CRT screen 11, a central unit 12, and a keyboard 13; a printer 2; a conveyor 3; a folder-inserter 4; and an electronic page inverter 5.

The central unit 12 and the printer 2 include respective standardized input/output connectors that, in the prior art, are designed to be connected together directly. In the invention, these two connectors are connected to respective connectors of the inverter 5. Another connector of the inverter 5 is connected to a connector of the folder-inserter 4, which is a conventional model.

Figure 2:
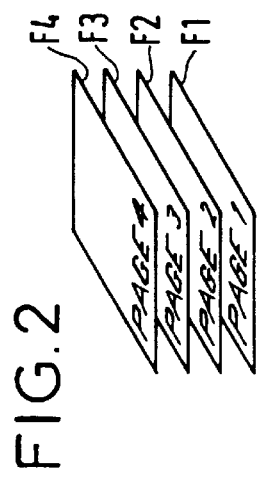
FIG. 2 shows printed sheets output by the printer of said mail processing system when the page inverter is not in operation.

FIG. 2 shows four sheets F1, . . . , F4 on which the printer 2 has printed four pages of a letter, the sheets being marked PAGE1, . . . , PAGE4. FIG. 2 shows what happens when the central unit 12 is directly connected to the printer 2, either via a prior art link or else because the inverter 5 is out of operation. The sheets F1, . . . , F4 stack up successively with their printed faces uppermost, such that the last page, PAGE 4, is the first page presented to a user for reading. This order is unsuitable for direct insertion in an envelope.

Figure 3:
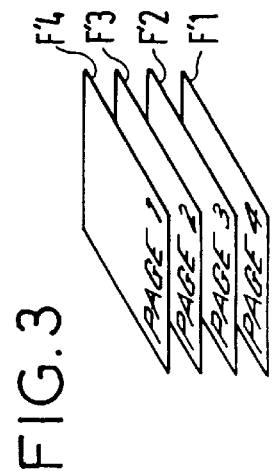
FIG. 3 shows the printed sheets output by the printer of said system when the inverter of the invention is in operation.

FIG. 3 shows four sheets F'1, . . . , F'4 on which the printer 2 has printed the four pages of a letter, but in this case the inverter 5 has been in operation. It can be seen that the sheets F'1, . . . , F'4 are stacked successively in that order and that they still have the printed face on top, however the first page of text, PAGE1, has been printed on sheet F'4. Consequently, the pages can be read in the order of increasing page number without there being any need to permute page order. The pages can therefore directly inserted in an envelope by means of a conveyor 3 which is very simple since it is not required to invert page order.

In this embodiment, the inverter 5 comprises:

- a microprocessor 50 associated with a read only memory 53 containing the operating program of the inverter;
- a read/write memory 54 of sufficient capacity to store a text that is 64 pages long, for example;
- input/output interfaces 52 connected, in particular, to the connectors of the inverter 5 which are in turn linked to the central unit 12, to the printer 2, and to the folder-inserter 4;
- a display device 51, optionally provided with a buzzer to warn the user when the number of pages stored by the inverter 5 exceeds a predetermined threshold value, said display 51 being connected to one of the outputs of the interfaces 52; and
- a bus 55 interconnecting the microprocessor 50, the interface 52, and the memories 53 and 54.

The printer 2 includes an outlet slot 21 which is connected to an inlet slot 41 of the folder-inserter 4 by the conveyor 3 which is constituted by a sloping plane 31 together with at least one roller 32 driven by a motor (not shown). The arrows show the path followed by each sheet leaving the printer 2. Each sheet conveyed by the conveyor 3 falls onto a sloping plane 43 which guides it as it drops towards the inlet 41. Another inlet of the folder-inserter 4 receives a stack of envelopes 44. An outlet of the folder-inserter 4 delivers a stack of envelopes 45, each containing the sheets making up a letter, which sheets have been folded and inserted in said envelope.

When a user causes a letter to be printed, the word processor system 1 outputs the text of the letter in the form of a sequence of binary words each representing an alphanumeric character. The operation of the inverter 5 requires the beginning of each page of the text that is to be inverted to be identified by the presence of a special character or by a special character string. This special character may be the standard ASCII character whose decimal code is 12, and which corresponds to striking a "page-eject" key on the keyboard 13. Alternatively, the beginning of a page may be identified by a special character string: $ INVERT $, for example.

The end of a series of pages constituting the text of a single letter must also be identified by a special character string, e.g.: $ INVERT END $. Other special character strings could be used to give instructions to the inverter 5, e.g. for bringing it into operation or for taking it out of operation (transparent).

The inverter 5 detects each of the special characters or special character string that mark the beginnings of pages. It stores each page sequentially in the read/write memory 54 and in sixty-four specialized registers corresponding to the sixty-four pages that the memory 54 can store, it records the start addresses of those pages.

The microprocessor 50 also includes a register for counting the pages that it receives. When it detects the special character string indicating the end of a letter, and providing the printer is delivering a signal indicating that it is ready, the microprocessor 50 causes the pages stored in the memory 54 to be read, beginning with the last-stored page. To do this, the microprocessor 50 uses the count register as a first pointer to point in succession to the registers containing the start-of-page addresses. The first pointer initially points to the register containing the address of the start of the last page of the letter. To read each of the characters of this page in their initial order, the microprocessor 50 uses a second pointer referred to as a character address pointer, which pointer is loaded with the start-of-page address as found in the register pointed to by the first pointer. The second pointer is then incremented as characters are printed by the printer 2.

The end of each page is marked by the character or character string marking the beginning of the following page, or by the character string marking the end of the series of pages.

When the microprocessor 50 detects that this special character or character string has been read in the memory 54, it stops incrementing the second pointer and it decrements the first point by unity. This process is reiterated until the microprocessor 50 detects that the first pointer has reached the first page, and that the special character or character string indicating the end of the first page has been read and detected.

When all of the pages of a letter have been printed, the printer 2 provides a signal indicating that it is again ready, and the inverter 5 deduces that it can start an operating cycle of the folder-inserter 4 providing the folder-inserter is supplying a signal indicating that it is ready. The inverter 5 thus also acts as a coordinator for the word processor 1, the printer 2, and the folder-inserter 4.

The inverter 5 can warn the user by means of the display 51 and optionally by means of a buzzer, in the event of an anomaly, e.g. too many pages relative to a threshold value corresponding to the maximum value acceptable by the folder-inserter 4; or else in the event that the printer 2 fails to give a ready signal.

In a variant embodiment, the inverter is not implemented in a stand-alone housing, but it is incorporated in the folder-inserter 4.

What is claimed is:

1. An electronic page inverter for a mail treatment system, the mail treatment system comprising a word processor system for redacting the text of a letter, a sheet-fed printer for printing the pages of the letter, and a folder-inserter mechanically coupled to the printer for receiving sheets on which the printer has printed the pages of the text, folding said sheets, and inserting them in an envelope, the inverter comprising:

input/output interfaces connected to the word processor system, the sheet-fed printer and the folder-inserter;

means for recording a sequence of binary words representing the alphanumeric characters of the letter as they are delivered by the word processor system;

means for inserting in the sequence of binary words a first control code at the beginning of each page of the letter, and a second control code at the end of the last page of the letter;

means for recognizing said first and second control codes in the recorded sequence of binary words for the purpose of playing back said recorded binary words to the printer, letter page by letter page in inverse order of letter pages from the last page to first page while keeping the characters making up each page in their initial order; and means for starting an operation cycle of the folder-inserter when all of the pages of the letter have been printed.

2. An electronic page inverter according to claim 1, wherein said means for recording a sequence of binary words comprises a first pointer to point in succession to registers containing start-of-page addresses and a second pointer which is implemented as characters are printed by the printer.

3. An electronic page inverter according to claim 1, further comprising means for recognizing in said recorded sequence of binary words third and fourth control codes for bringing into operation or for taking out of operation the inverter respectively.

4. An electronic page inverter according to claim 1, further comprising an alarm device to warn the user of the mail treatment system in the event of an anomaly.

5. A folder-inserter for co-operating with a word processor system and a sheet-fed printer of a mail treatment system, said folder-inserter being mechanically coupled to the printer and being electronically coupled to the word processor system and to the printer by an electronic page inverter according to claim 1 which is incorporated in said folder-inserter.

6. A folder-inserter for co-operating with a word processor system and a sheet-fed printer of a mail treatment system, said folder-inserter being mechanically coupled to the printer and being electronically coupled to the word processor system and to the printer by an electronic page inverter according to claim 2 which is incorporated in said folder-inserter.

7. A folder-inserter for co-operating with a word processor system and a sheet-fed printer of a mail treatment system, said folder-inserter being mechanically coupled to the printer and being electronically coupled to the word processor system and to the printer by an electronic page inverter according to claim 3 which is incorporated in said folder-inserter.

8. A folder-inserter for co-operating with a word processor system and a sheet-fed printer of a mail treatment system, said folder-inserter being mechanically coupled to the printer and being electronically coupled to the word processor system and to the printer by an electronic page inverter according to claim 4 which is incorporated in said folder-inserter.

* * * * *